Patented Dec. 30, 1941

2,268,109

UNITED STATES PATENT OFFICE 2,268,109

CRACKING USING SYNTHETIC CATALYTIC COMPOSITIONS

Gerald C. Connolly, Baton Rouge, La., assignor to Standard Oil Development Company, a corporation of Delaware No Drawing. Application December 6, 1938, Serial No. 244,177

5 Claims. (Cl. 196—52)

This invention deals with the use of superior activated synthetic gel catalysts and especially to the use of such catalysts for the catalytic cracking of hydrocarbons such as those occurring in petroleum. More particularly, this invention relates to the use of certain elements of group VI of the periodic table for improving the catalytic cracking activity of various synthetic gel catalytic masses.

Certain metal compounds such as silica and alumina have the property of existing in the hydrogel form, which, upon drying, yields a very porous mass, (dried gel) of high catalytic activity. These hydrogels are generally prepared by allowing a hydrosol to "set" until a considerable portion of the reaction liquid is imbibed by some sort of colloidal structural arrangement. Two different hydrogels may be intimately mixed to obtain a mechanical mixture (mixed gel), which upon drying, may have superior properties over either one of the individual constituents. Plural hydrogels are obtained by allowing a mixed hydrosol of different metal compounds to "set." Impregnated gels may be prepared by soaking washed hydrogels in different salt solutions so that the latter are completely dispersed throughout the mass. Gelatinous precipitates differ from hydrogels by the fact that they separate from the liquor as a slimy fluid jelly in a separate phase leaving some supernatant liquid above. A heterogeneous gel, on the other hand, is a gelatinous precipitate dispersed in a hydrosol and allowed to "set" or "gel."

For the purpose of this invention, the term "hydrous oxide jelly" will be employed to designate all gels other than those in the dried form which no longer possess the flexible characteristics attributable to gels containing appreciable amounts of imbibed water.

For example, a hydrosol of silica may be prepared by mixing equal volumes of 25° Bé. sodium silicate solution and 23° Bé. sulfuric acid solution. In 3-5 hours, the hydrosol sets to a silica hydrogel, imbibing all of the reaction liquids. The hydrogel may be broken up, washed free of reaction salts, formed if desired and dried. Hydrous alumina hydrogel may be prepared by mixing with stirring, a solution of 10 kg. of $Al_2(SO_4)_3.18H_2O$ dissolved in 100 liters of water with 100 liters of 1 N $NH_4OH$, and washing by decantation with distilled water. A mechanical mixture of the two hydrogels is obtained by intimate mixing of the two washed hydrogels.

Plural hydrogels of silica and alumina in the ratio of 12:1 may be prepared by adding a volume of 23° Bé. sulfuric acid solution containing aluminum sulfate equivalent to one mole of $Al_2O_3$, to an equal volume of 25° Bé. sodium silicate solution. After the hydrogel has set, it is washed with distilled water.

Impregnated gels having molal ratios of about 12 $SiO_2$:1$Al_2O_3$ are prepared by soaking washed silica hydrogel overnight in a 30% solution of $Al(NO_3)_3.9H_2O$, draining, drying, and decomposing the aluminum nitrate by heat. These dried products of hydrogels which no longer retain their spongy characteristics are known as dried gels.

The present invention is specifically concerned with the production of dried gel catalysts containing the left-hand elements of group VI of the periodic table, i. e. chromium, molybdenum, tungsten and uranium. These elements, added preferably in the form of their water soluble salts, may be incorporated in the hydrosol or heterogeneous gel or employed as a mixed hydrous gel or used for impregnating hydrous or dried gels. The amount of these elements added to these catalysts is very small, preferably not over about 0.5% to 1%, since it has been found that higher amounts detrimentally affect the activity of the gel catalyst. Although silica-alumina gels are preferred as base stocks, the invention is not limited to this material but is applicable to other hydrous oxide gels possessing some catalytic activity.

In the preferred procedure, it is desirable to employ co-impregnated silica hydrogels obtained by soaking the purified silica hydrogel produced in known manner in a mixed solution of a soluble aluminum salt such as aluminum nitrate, and a soluble salt (usually the ammonium salt or the nitrate) of the metal promoter desired. The resulting product is drained, dried, decomposed by heating, and ground or formed, if desired.

It has been found that although alumina-silica gels are fairly active catalysts for cracking reactions, their cracking activity can be appreciably improved by the addition of small amounts of these promoters, which comprise salts of cromium, molybdenum, tungsten, uranium, or mixtures thereof.

The invention can be more clearly understood by reference to the following examples, which, however, are not intended to limit the invention in any respect:

Example 1.—A purified silica hydrogel was prepared and impregnated with aluminum nitrate so that the dried gel produced contained about 12.5% of alumina. This gel had a density of 0.600 and was employed for the cracking of West Texas gas oil of 33.8 A. P. I. gravity for a period of 2 hours at a temperature of 855° F., and a feed rate of 0.615 vol./vol./hr. The amount of gasoline obtained was 50% by volume. The liquid product had an A. P. I. gravity of 46.9 and the rejected gas obtained amounted to 11.6 liters per hundred grams of liquid product, the gas density being 0.98.

*Example 2.*—The same silica hydrogel as that described in Example 1 was impregnated with a mixture of aluminum nitrate and ammonium thio tungstate so that the resulting dried gel contained about 12.5% $Al_2O_3$ and 0.1% $WO_3$. The apparent density of the final catalyst was 0.612, and when subjected to the cracking conditions disclosed in Example 1, it gave a gasoline yield of 56%. The gasoline had an A. P. I. gravity of 49.6, and the amount of rejected gas produced was 10.2 liters per hundred grams of liquid product, the density of the gas being 1.04. It can be seen that the addition of the small amount of tungsten raised appreciably the yield of gasoline and lowered somewhat the amount of gas produced in the cracking operation.

*Example 3.*—A catalyst was prepared as in Example 2, but the final dried gel contained 12.5% $Al_2O_3$ and 1.5% $WO_3$. The gasoline yield in this case was 45%, having an A. P. I. gravity of 44.9. The amount of rejected gas formed was 12.9 liters per hundred grams of liquid product, the density being 0.89. This example shows that the addition of over 1% of tungsten reduced considerably the amount of gasoline formed and increased substantially the amount of rejected gas produced.

*Example 4.*—A co-impregnated silica hydrogel was obtained as in Example 2, except that the final dried gel contained 12.5% $Al_2O_3$, and 5.0% $WO_3$. The gasoline yield obtained in this case was 43.5% and the gas yield was 15.1%, showing that further increase of tungsten decreased further the amount of gasoline and increased the amount of gas formed.

*Example 5.*—A co-impregnated silica gel was prepared as in Example 2, except that an uranium salt was employed instead of a tungsten salt. The dried gel contained 12.5% alumina and 0.1% $UO_3$. Its apparent density was 0.613 and upon cracking under conditions such as those described in Example 1, a 54.5% yield of gasoline was obtained. The liquid product had an A. P. I. gravity of 48.8 and the amount of rejected gas formed was 10 liters per hundred grams of liquid product, the density of the gas being 1.07. The improvement in this case over the unpromoted catalyst described in Example 1 is that a higher yield of gasoline is obtained and a lower yield of rejected gas.

*Example 6.*—In this case a catalyst was prepared as in Example 5, but the dried gel analyzed 12.5% alumina and 1.5% $UO_3$. The gasoline yield in this case was 52%, and the rejected gas amounted to 11 liters per hundred grams of liquid product, showing that the further addition of uranium to the catalyst resulted in a slight drop in activity as shown by the decrease in gasoline production and increase in gas.

*Example 7.*—The catalyst was prepared in accordance with the directions given under Example 5, except that the dried gel in this case contained 5.0% $UO_3$ and 12.5% $Al_2O_3$. The gasoline yield obtained under cracking conditions given in Example 1 was 50.0%, and the gas yield was 11.4 liters per hundred grams of liquid, showing a somewhat further drop in activity.

*Example 8.*—A catalyst was prepared as in Example 2, except that a molybdenum salt was employed as a promoter instead of a tungsten salt. The resulting dried gel contained 0.1% $MoO_3$ and 12.5% $Al_2O_3$. With this catalyst a yield of 56% gasoline was obtained showing a decided increase in activity over that of the unpromoted catalyst described in Example 1.

*Example 9.*—This catalyst was prepared in a similar manner as that disclosed in Example 8, with the exception that the dried gel contained 1.5% $MoO_3$ and 12.5% $Al_2O_3$. Cracking with this catalyst resulted in a gasoline yield of 18% and a gas production of 23.8 liters per hundred grams of liquid product, showing a decided drop in activity caused by the presence of an excessive amount of promoter.

*Example 10.*—In this example the catalyst was prepared according to Example 8, but the dried gel contained 5% $MoO_3$ and 12.5% $Al_2O_3$. With this catalyst only a 14% yield of gasoline was obtained together with a gas yield of 30.6% liters per hundred grams of liquid. This result shows that further additions of the molybdenum salt continued to decrease the activity of the gel catalyst.

*Example 11.*—A co-impregnated silica hdyrogel catalyst was prepared in accordance with the method described in Example 2, except that the promoter in this case was a chromium salt, and the dried gel contained beside silica, 0.1% $Cr_2O_3$ and 12.5% $Al_2O_3$. The apparent density of this catalyst was 0.628. When the cracking was carried out under substantially the same conditions as in the previous examples, a gasoline yield of 53.5% was obtained, the rejected gas amounting to 9.7 liters per hundred grams of liquid product. It will be observed that the small addition of chromium salt appreciably increased the gasoline yield and caused a corresponding decrease in the amount of rejected gas produced.

*Example 12.*—This operation was carried out with a catalyst prepared in the same manner as that disclosed in Example 1, except that the dried gel contained 1.5% $Cr_2O_3$ and 12.5% $Al_2O_3$. The gasoline yield obtained amounted to only 31.5%, and the rejected gas formed corresponded to 21.5 liters per hundred grams of liquid product. The detrimental effect of the excessive addition of the promoter is obvious from the above data.

*Example 13.*—This catalyst was similar to the preceding one with the exception that it contained 5.0% $Cr_2O_3$. The cracking operation with this material resulted in the production of only 13% gasoline and 22 liters of rejected gas per hundred grams of liquid product, showing that further additions of chromium had a decidedly detrimental effect upon the cracking reaction.

Although these catalysts operate most satisfactorily when employed for cracking reactions, especially in the cracking of petroleum hydrocarbons, they may be advantageously employed for catalyzing other reactions such as dehydrogenation, alkylation, isomerization, aromatization, polymerization, and the like.

Various modifications may be made within the scope of the present disclosure, and the invention is not limited to any particular examples or theory of operation, but only by the following claims in which it is intended to cover the invention as broadly as the prior art permits.

I claim:

1. A method of cracking higher boiling hydrocarbons into lower boiling hydrocarbons suitable for motor fuel which comprises contacting said oil with an adsorbent siliceous catalyst mass containing alumina and a group VI metal oxide in a cracking zone, the amount of said group VI metal oxide in the catalyst being of the order of 0.1%, maintaining said cracking zone at an active cracking temperature and keeping said hydrocarbons within said cracking zone for a period sufficient to obtain the desired cracking thereof.

2. A method of cracking higher boiling hydrocarbons into lower boiling hydrocarbons suitable for motor fuel which comprises contacting said oil with an adsorbent siliceous catalyst mass containing alumina and not more than 1% of a group VI metal oxide in a cracking zone, said adsorbent siliceous catalyst mass being formed by impregnating a hydrous oxide of silica with decomposable salts of aluminum and group VI metals convertible into the oxides, the resulting product being dried and the salts converted into the oxides, maintaining said cracking zone at active cracking temperature and keeping said hydrocarbons within said cracking zone for a period sufficient to obtain the desired cracking thereof.

3. The method defined in claim 2 wherein the group VI metal oxide is tungsten oxide.

4. The method defined in claim 2 wherein the group VI metal oxide is molybdenum oxide.

5. The method defined in claim 2 wherein the group VI metal oxide is chromium oxide.

GERALD C. CONNOLLY.